May 2, 1933. G. L. R. J. MESSIER 1,906,479
SUSPENSION SYSTEM FOR VEHICLES
Filed Oct. 28, 1927 2 Sheets-Sheet 2
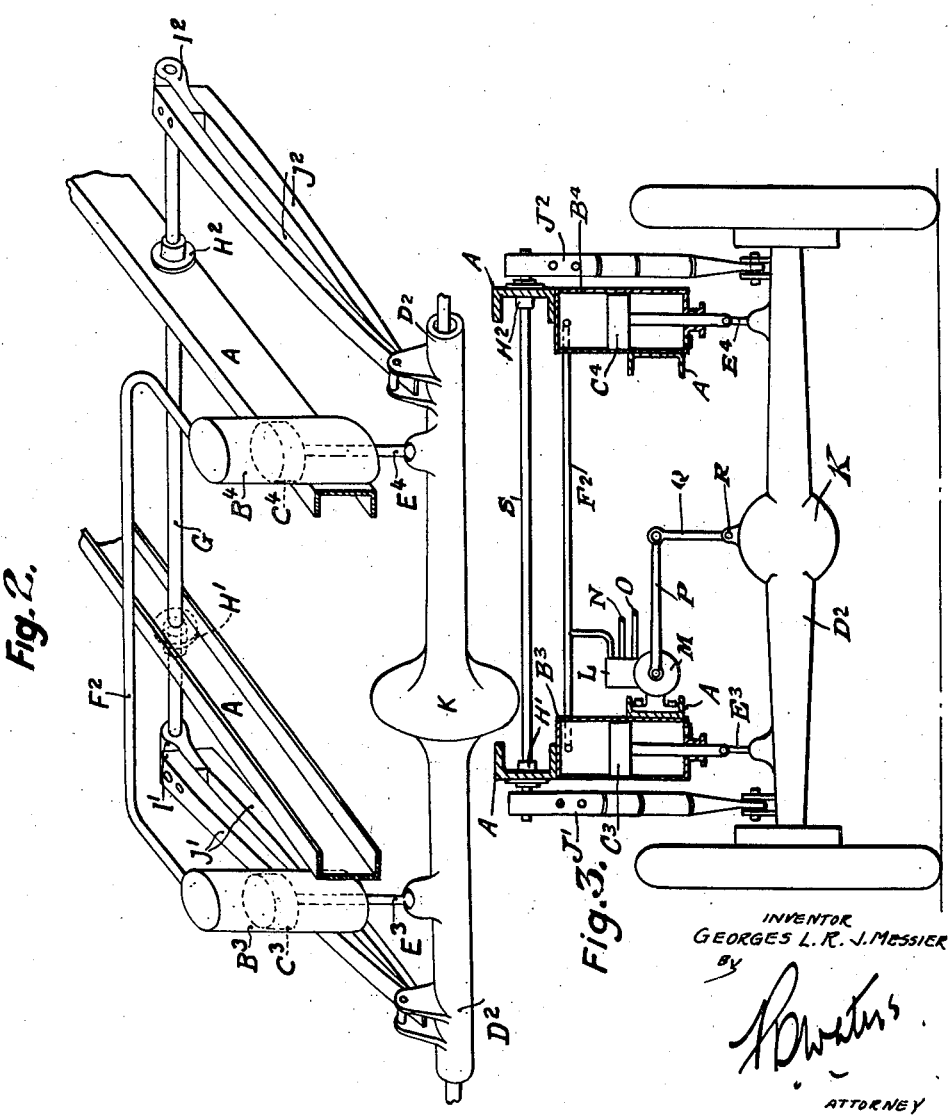
INVENTOR
GEORGES L. R. J. MESSIER
BY
ATTORNEY Patented May 2, 1933

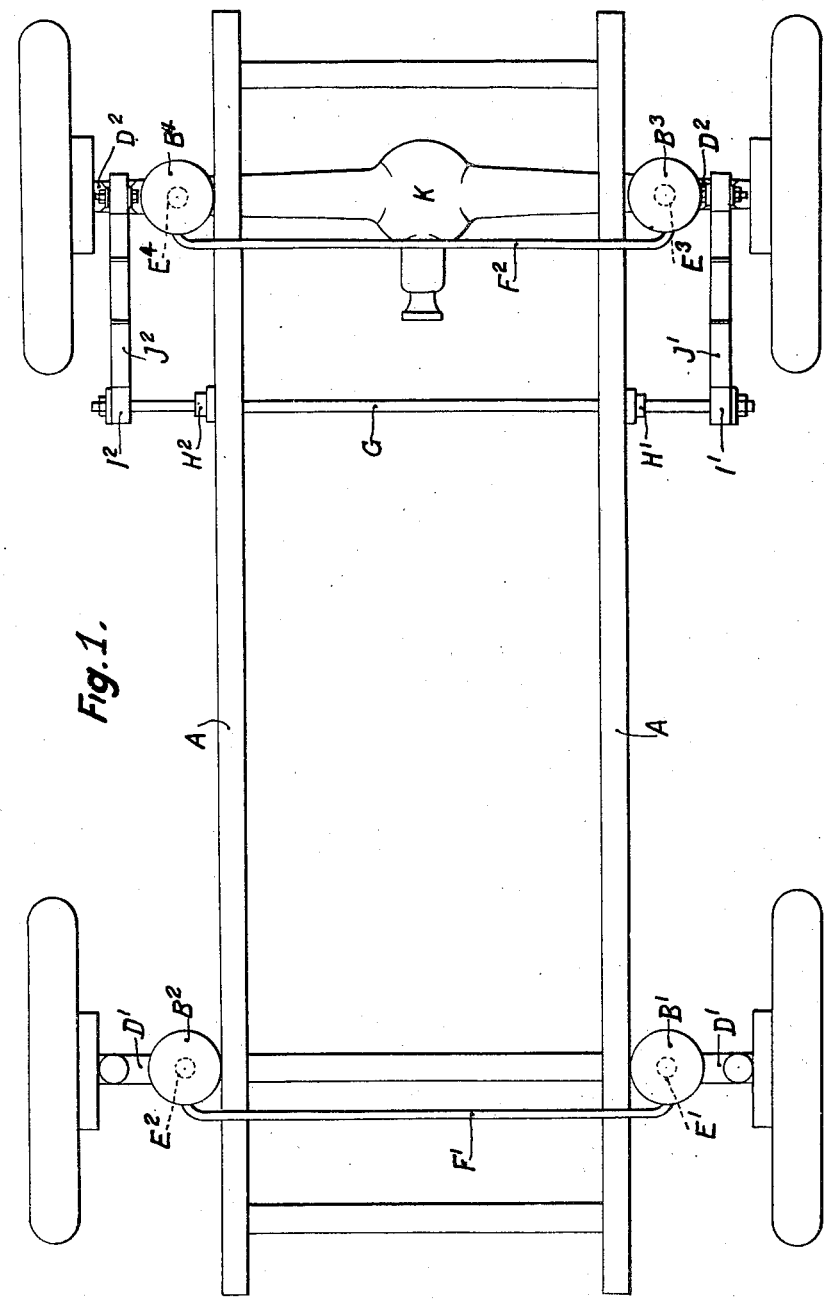

1,906,479

UNITED STATES PATENT OFFICE

GEORGES LOUIS RENÉ JEAN MESSIER, OF PARIS, FRANCE

SUSPENSION SYSTEM FOR VEHICLES

Application filed October 28, 1927, Serial No. 229,417, and in France November 9, 1926.

There are already in existence elastic and shock absorbing devices intended for the pneumatic suspension of vehicles and more particularly of motor vehicles.

In principle, such devices which can replace or in some cases complete the usual suspension by metallic springs, are constituted, as is well known, by four independent cylinders secured to the chassis of the vehicle, in each of which a piston travels, the rod of which is connected to the end of a front or rear axle. The upper portion of the cylinders may be in communication with a compressed air tank, whilst the bottom portion of the cylinders is in direct communication with the atmosphere.

The operation of such known members tends to bring the piston constantly back to a mean equilibrium position situated about the center of the cylinder, whatever be the causes which tend to vary the relative position of the piston and of the cylinder.

It will be understood that three zones have to be distinguished in the stroke of the piston, viz:—an extreme zone corresponding to the admission; a mean neutral zone corresponding to the closing both of the admission and of the exhaust ports, and an extreme zone during which the exhaust takes place.

In these described pneumatic suspension systems, the height of the mentioned neutral zone must be reduced to the limit fixed by due considerations of stability, which, as is readily understood, means that there is a very considerable consumption or actual waste of air.

According to the present invention in order to minimize said consumption without affecting the stability of the vehicle, the two air-chambers, forming the pneumatic cushions above each axle, are interconnected—instead of being separate as in said known systems—and the stability of the vehicle is secured by mean of mechanical stabilizers independent of the pneumatic suspension and which may be of any known type. It becomes thus possible to increase considerably the height of said neutral zone without reducing the stability of the vehicle.

Thus the characteristic combination of the invention comprises the following three means or devices, all of which are necessary.

(a) Two elastic supporting systems arranged one at the front and the other at the rear of the vehicle and elastically supporting the chassis, each system comprising in principle a pair of cylinders connected or secured to the chassis, and a pair of pistons, the movements of which are controlled, directly or indirectly, by those of the axle (or of the wheels in the case of vehicles with independent supported wheels), a compressed air cushion being enclosed between each piston and one of its cylinder's covers. The assembly of these parts could also be effected conversely such that the pistons would be secured to the chassis, and the cylinders connected to the axles.

(b) In each elastic supporting system, an intercommunication device between the two air-chambers, ensuring permanent equality of pressures in the two cylinders of the same pair.

(c) One or two non-pneumatic, elastic stabilizing or straightening systems, independent of said supporting systems, i. e. non-supporting, each tending to maintain parallelism between the chassis and an axle. Each of these stabilizing systems could be constituted by any mechanical elastic connection between the chassis and one of the axles, enabling the axle to move freely as long as it remains parallel to the chassis, but offering elastic opposition to angular movements of the chassis relatively to the axle.

If desired, the combination just described could comprise, in addition, for each pair of elastic supporting means, a single distribution system controlled by the movements of the axle or of a piston.

The essential advantage of such a combination is that as the lateral stability is ensured by the elastic stabilizing system or systems, it is possible to considerably increase the neutral zone of each cylinder, and consequently to reduce to a minimum the consumption of air, while at the same time enhancing the elasticity and flexibility given by the pneumatic suspension, without interfering with said lateral stability of the vehicle.

In the second place, owing to the intercommunication between the two air chambers of the same pair of supporting means, only two air distributions or valve gears are required in place of four. Moreover, if each of the distributors is controlled by the displacements of the centre of the corresponding axle, the consumption of compressed air will be still further greatly reduced.

It must be pointed out that in the combination described, the supporting elements being the two pairs of elastic pneumatic cushions, front and rear, the stabilizing systems are never exposed to serious stresses. They can be constituted therefore by metallic springs of a small weight, the metallic spring in such conditions of use being free from the drawback that it would have when constituting the suspension properly speaking (shocks, excessive strains on bad roads, involving a modification in the texture of the spring and a variation of the comfort of the suspension according to the load of the vehicle).

In the accompanying drawings, Figures 1 and 2, by way of example and a purely diagrammatical form, illustrate the construction of the combination. Figure 1 is a plan view, while Figure 2 is a perspective view of the rear of a vehicle chassis equipped with the invention as embodied in said combination.

Figure 3 illustrates a rear view of a vehicle having the rear portion of the chassis pneumatically supported by the rear axle, provided with mechanical stabilizing devices independent of the pneumatic supports, and having the intercommunication between the two pneumatic cushions arranged above said rear axle associated with common means of distribution controlled by the displacements of the central portion of said rear axle.

The chassis A (here the longitudinal members of the chassis) carries two front cylinders B1 and B2 and two rear cylinders B3 and B4 in which work respectively the pistons C1 to C4 connected to the axles D1, D2 by four rods E1 to E4.

The intercommunication between the airchambers into the cylinders of the same pair is ensured by two pipes, one F1 connecting together the cylinders B1 and B2, and the other F2 connecting B3 and B4.

In the construction illustrated, it has been assumed that the combination comprises only a single stabilizing system arranged at the rear of the chassis. A similar system could be provided in front. This system comprises a transverse or cross spindle G rotating in two sleeves H1 and H2 secured to the chassis. To the ends of the spindle G are keyed two blocks $1^1$ and $1^2$ to which are bolted two elastic double arms J1 and J2 articulated or connected by any suitable means to the rear axle D2.

In this stabilizer system, the necessary play or elasticity is obtained either by the use of the elastic arms J1 and J2, or by the use of a resilient cross spindle G having sufficient elasticity of its own to be able to make a torsional movement, or also by the combination of these two elastic spring arms and resilient spindle, or finally by an elastic connection between rigid arms and spindle.

In Figure 3, the cylinders $B^3$ and $B^4$ are also interconnected by means of pipe $F^2$, the latter communicating through a short pipe with an auxiliary reservoir L, fixed to the chassis A and having its interior connected to a tap M. The inlet pipe N and the exhaust pipe O of the principal reservoir of compressed air (not shown) terminate in the auxiliary reservoir L. A lever Q, pivoted to a point R near the center of the rear axle housing $D^2$, transmits the displacements thereof with respect to the chassis A to a lever P controlling the tap M. This modification has, similar to the disclosure of preceding figures, the mechanical stabilizing system comprising spindle G, pivoted in journals $H^1$ and $H^2$ and elastic arms $J^1$ and $J^2$ secured on each end of spindle G and articulated to two points of the axle housing $D^2$.

The invention has been described for an extremely general case of a vehicle with two axles, but it is understood that it is applicable equally well to vehicles comprising more than two axles.

What I claim and desire to secure by Letters Patent of the United States is:—

1. A system of suspension for vehicles, comprising in combination, pneumatic suspension devices between the chassis and axles of the vehicle, arranged in pairs with respect to each axle and each comprising a cylinder and a piston providing a pneumatic cushion between the piston and cylinder head filled with gas under pressure, said cushions in each pair of devices being substantially in the same horizontal plane, means of intercommunication connecting said cushions in pairs, and stabilizing means cooperating with said pneumatic suspension devices by directly serving as balancing and anti-rolling means for one pair of the same and for the associated axle thereof and the vehicle as a whole, comprising journals transversely opposite in said chassis, a cross spindle rotatably mounted in said journals and radius arms on the ends of said spindle engaging the rear axle of the vehicle, one element of said means of stabilization being resilient.

2. A system of suspension for vehicles, comprising in combination, pneumatic suspension devices between the chassis and respect to each axle and each comprising a cylinder and a piston providing a pneumatic cushion between the piston and cylinder head filled with gas under pressure, said cushions in each pair of devices being substantially in the same horizontal plane, means of intercommunication connecting said cushions in pairs, and stabilizing means cooperating with said pneumatic suspension devices by directly serving as balancing and anti-rolling means for one pair of the same and for the associated axle thereof and the vehicle as a whole, comprising journals transversely opposite in said chassis, a cross spindle rotatably mounted in said journals, flexible radius arms rigidly fixed on the ends of said spindle and articulation means between the rear axle of the vehicle and the free ends of said flexible radius arms.

3. A system of suspension for vehicles, comprising in combination, pneumatic suspension devices between the chassis and axles of the vehicle, arranged in pairs with respect to each axle and each comprising a cylinder and a piston providing a pneumatic cushion between the piston and cylinder head filled with gas under pressure, said cushions in each pair of devices being substantially in the same horizontal plane, means of intercommunication connecting said cushions in pairs, and stabilizing means cooperating with said pneumatic suspension devices by directly serving as balancing and anti-rolling means for one pair of the same and for the associated axle thereof and the vehicle as a whole, comprising journals transversely opposite in said chassis, a cross spindle rotatably mounted in said journals and radius arms on the ends of said spindle engaging the rear axle of the vehicle, one element of said means of stabilization being resilient, common means of distribution of gas under pressure for each pair of cylinders, a conduit between said means of distribution and means of intercommunication, and control means for said means of distribution actuated by the displacement of the corresponding axle of the vehicle.

4. A suspension system for a vehicle having four wheels connected together in pairs by means of a front axle and a rear axle, including the combination of four spaced pneumatic supporting devices individually comprising a cylinder and a piston enclosing therebetween a variable volume of air forming an air cushion, each piston being individually connected to an end of one of said axles and the corresponding cylinder thereof secured to the chassis of the vehicle, the air chambers of the front cylinders being interconnected by a pipe and the air chambers of the rear cylinders being similarly interconnected by a pipe, common distribution means for admission and exhaustion of the air in each of the front and rear pairs of the cylinders operatively controlled by an intermediate portion of the respectively associated axle by movement of the latter, and stabilizing means cooperating with said pneumatic supporting devices by directly serving as balancing and anti-rolling means for the rear pair of the same and for the associated rear axle and the vehicle as a whole, comprising a cross spindle spaced from the rear axle in parallelism therewith, which spindle is rotatable in journals secured to the chassis, a lever arm formed by two springs exposed to bending connecting each end of said spindle to the corresponding end of said rear axle located upon the same side of the vehicle.

GEORGES LOUIS RENÉ JEAN MESSIER.